United States Patent [19]

Larsen et al.

[11] 4,200,837
[45] Apr. 29, 1980

[54] REMOTE RADIO SELECTOR WITH MANUAL OVERRIDE

[75] Inventors: Morrie E. Larsen, Carlsbad; Alain Hackstaff, Escondido, both of Calif.

[73] Assignee: Summa Corporation, Las Vegas, Nev.

[21] Appl. No.: 957,650

[22] Filed: Nov. 3, 1978

[51] Int. Cl.² .............................................. H04B 1/38
[52] U.S. Cl. ........................................ 455/92; 455/99
[58] Field of Search ................. 325/111, 115, 53, 161, 325/15, 16, 21, 158, 183; 343/208

[56] References Cited

U.S. PATENT DOCUMENTS

| 2,421,516 | 6/1947 | Mitchell | 325/16 X |
| 4,032,844 | 6/1977 | Imazeki | 325/183 X |

*Primary Examiner*—Robert L. Richardson

*Attorney, Agent, or Firm*—Smyth, Pavitt, Siegemund, Jones & Martella

[57] ABSTRACT

A manual radio selector switch, normally used in aircraft, is provided with a particular switch position which is connected to a cyclical stepping switch. When the manual radio selector switch is in this position, the choice of radio is effected by the cyclical stepping switch. The cyclical stepping switch is stepped under control of the pilot who changes from one radio to the next by actuating a stepping switch on his control stick, whereby, when the manual radio selector switch is in the particular switch position, the pilot can change radios without the necessity of removing his hand from the control stick. One of several indicator lamps on the instrument panel indicates which radio has been selected by the pilot. When the pilot is transmitting, the light corresponding to the radio being used will flash.

3 Claims, 2 Drawing Figures

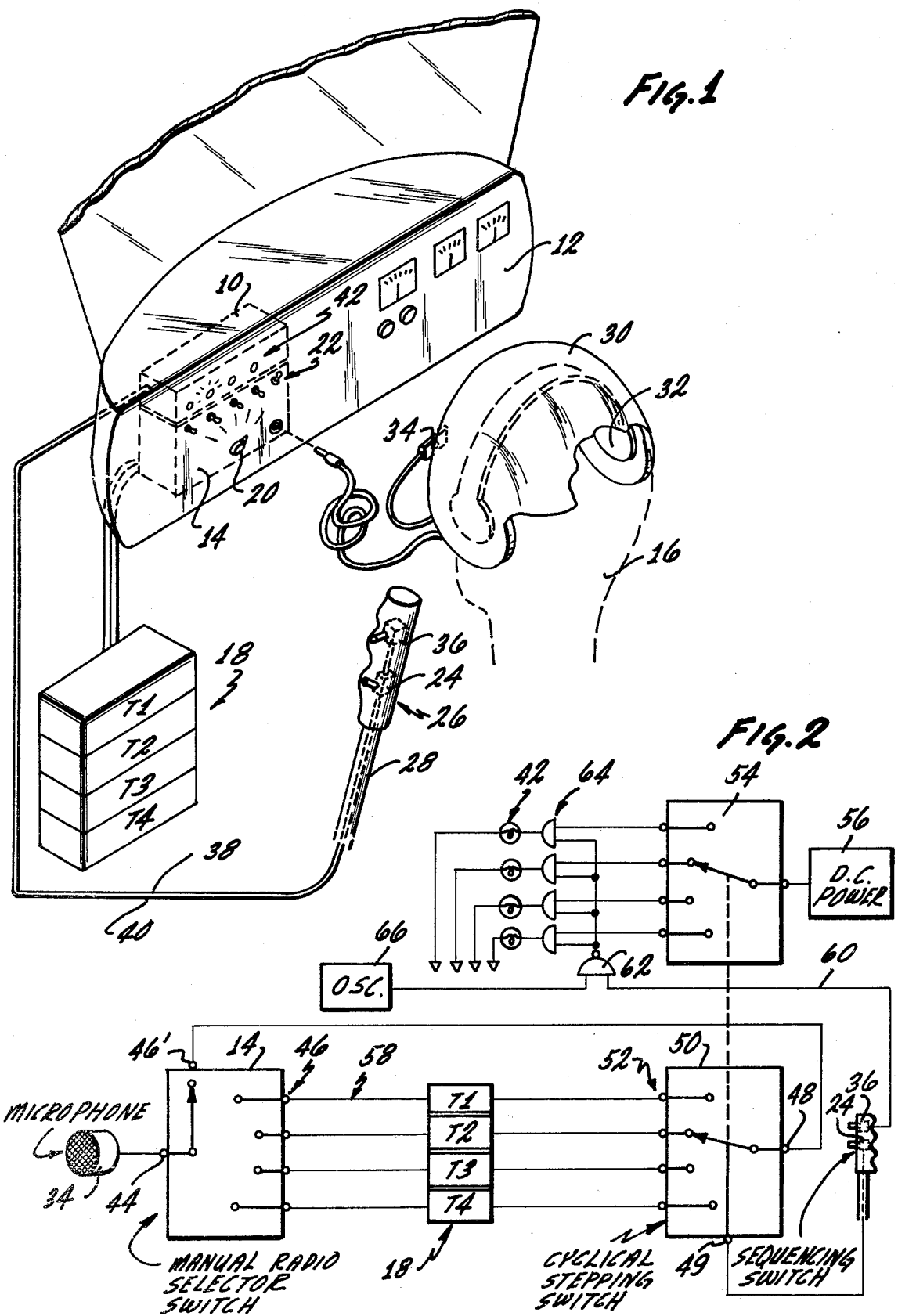

REMOTE RADIO SELECTOR WITH MANUAL OVERRIDE

BACKGROUND OF THE INVENTION

The present invention is in the field of aircraft and particularly relates to apparatus to facilitate selection of a radio transmitter by a pilot.

Intense concentration and very high work loads are required of the pilots of modern aircraft, particularly military helicopters. Any task requiring the pilot to remove his hands from a primary flight control should be eliminated if possible. One such task which has always been very distracting to the pilot is selecting the radio he wishes to transmit on. Typically, in the prior art, it was necessary for the pilot to remove his hand from the control stick to reach for a manual radio selector switch, usually mounted on the instrument panel, and to turn the switch to select the desired radio.

SUMMARY OF THE INVENTION

In accordance with the present invention the pilot can switch from one radio to another merely by pushing a sequencing switch push button located on his control stick. The manual radio selector switch on the instrument panel can, if desired, be used to select the radio or to override the present invention in the event it should malfunction. The manual radio selector switch includes a position in which operation of the present invention is enabled. It is only when the manual radio selector switch is in this position that the pilot can control the selection by use of the sequencing switch on the control stick.

The sequencing switch on the control stick produces a stepping signal when the pushbutton is depressed, and the stepping signal is used to actuate a cyclical stepping switch which connects the pilot's microphone selectively to the radio transmitters in a sequence in response to a succession of stepping signals.

In a preferred embodiment, one of several indicator lamps on the instrument panel indicate which radio has been selected by the pilot. When the pilot is transmitting, the light corresponding to the radio being used will flash.

Thus, the present invention is a device which is added to the existing manual radio selector switch and which can be overridden by the manual switch if necessary.

The novel features which are believed to characterize the invention both as to its structure and method of operation together with further objects and advantages thereof, will be better understood from the following description considered in connection with the accompanying drawings in which a preferred embodiment of the invention is illustrated by way of example.

BRIEF DESCRIPTION OF THE DRAWINGS

FIG. 1 is a perspective view showing the general arrangement of the parts of the present invention; and, FIG. 2 is an electrical block diagram showing a preferred embodiment of the invention.

DETAILED DESCRIPTION OF THE PREFERRED EMBODIMENT

Turning now to the drawings, in which like parts are denoted by the same reference numeral, FIG. 1 is a perspective view of the interior of the pilot's compartment showing an instrument panel 12 on which normally is mounted a manual radio selector switch 14 which conventionally is used by the pilot 16 to select which one of several transmitters 18 he wishes to use.

As is conventional in the art, the pilot 16 selects the transmitter he desires to use by rotating the knob 20 to a desired setting, and the pilot selects the receiver he wishes to use by actuating one or more of the toggle switches 22.

In accordance with the present invention, a small box 10 is mounted adjacent the manual radio selector switch 14 and a sequencing switch 24 is included in the hand grip 26 of the control stick 28. The electrical interconnection of these parts will be described below.

The pilot 16 wears a helmet 30 which includes earphones 32 and a microphone 34. The control stick 28 further includes a keying switch 36 which the pilot must push to cause his words to be transmitted by one of the transmitters. The keying switch 36 and the sequencing switch 24 are connected to the box 10 by the cables 38, 40. The box 10 further includes a set of indicator lamps 42, one of which is lit to indicate which of the transmitter is actually in use, the indicator lamp 42 associated with it is caused to blink as will be described below.

Turning now to FIG. 2, the electrical interconnections of the units will now be discussed. The microphone 34 is connected to an input terminal 44 of the manual radio selector switch 14. The switch 14 is manually actuated by the pilot 16 by turning the knob 20 to connect the input terminal 44 with a selected one of the output terminals 46. One of the output terminals 46' is connected to the input terminal 48 of the cyclical stepping switch 50. The cyclical stepping switch 50 has output terminals 52, and each of the transmitters 18 (T1 through T4) is connected to a different one each of the four output terminals 52.

The cyclical stepping switch 50 is electrically actuated in a preferred embodiment by closing of the sequencing switch 24, which is connected to the stepping terminal 49 of the switch 50. The switch 50 is called a cyclical stepping switch because each time the sequencing switch 24 is closed, the input terminal 48 of the switch 50 is stepped from interconnection with one of the terminals 52 to another of the output terminals, and when the last of the output terminals has been reached, the next output terminal is the first one. The cyclical stepping switch 50 includes a second gang 54 of contacts which are used to apply power from a power supply 56 to one of the indicator lamps 42 determined by the position of the cyclical stepping switch 50.

In operation, the pilot retains the option of selecting a transmitter in the traditional way, by turning the knob 20 which moves the manual radio selector switch 14 to a position at which the microphone 34 is connected via one of the lines 58 to a selected one of the transmitters 18. However, when the present invention is used, the pilot has the further option of rotating the knob 20 to bring the switch 14 into the position 46' shown. The signals from the microphone are transferred from the terminal 46' to the input terminal 48 of the cyclical stepping switch 50, and the pilot can then designate a desired transmitter for use by actuating the sequencing switch 24 one or more times as required to step the cyclical stepping switch 50 to the position corresponding to the desired transmitter to be designated. As the cyclical stepping switch 50 is stepped, its second gang 54 is also stepped to apply power from the power supply 56 to one of the indicator lamps 42 corresponding to the designated transmitter. In the absence of a keying signal on the line 60, the output of the NAND gate 62 remains high, and the power is applied through one of the AND gates 64 to one of the indicator lamps 42, causing the lamp to be lit steadily.

When the pilot has actuated the keying switch 36, the line 60 goes high causing the output of the NAND gate 62 to oscillate at a blinking frequency determined by the oscillator 66. This, in turn, causes the AND gate 64 to interrupt periodically the flow of power to the designated lamp 42, thereby causing the lamp to blink when the keying switch has been actuated. This manner of producing the blinking of the designated indicator lamp 42 is advantageous because if the indicator lamp does not blink when the keying switch 36 has been actuated, a malfunction in the circuitry of the present invention is indicated.

In summary, the present invention is an apparatus which can be added on to the manual radio selector switch normally used on an aircraft to permit the pilot to select a radio transmitter. The apparatus of the present invention gives the pilot the option of being able to designate a transmitter without having to remove his hand from the control stick. An indicator light emits a steady light to indicate which of the transmitters has been designated. When the designated transmitter is actually used, as determined by the pilot's actuating the keying switch on the control stick, the indicator lamp for the designated transmitter blinks. If the lamp fails to blink, a malfunction in the apparatus of the present invention is indicated. In that event, the pilot must designate the transmitter in the normal manner, that is, by removing his hand from the control stick and turning the knob of the manual selector switch.

For simplicity of explanation, the switches of the present invention have been shown in simplified form. It is understood, however, that solid state electronic switches are preferably used.

The foregoing detailed description is illustrated of one embodiment of the invention, and it is to be understood that additional embodiments will be obvious to those skilled in the art. The embodiment described herein, together with the additional embodiments, are considered to be within the scope of the invention.

What is claimed is:

1. Apparatus for use in an aircraft having a control stick, to permit an operator to select one of several radio transmitters to transmit on without having to remove his hand from the control stick, a microphone being provided for use by the operator, said apparatus comprising:

a sequencing switch mounted on the control stick at a position accessible to the operator's hand, manually actuated by the operator to produce a stepping signal;

a cyclical stepping swith having an input terminal and having output terminals, and having means for selectively connecting said input terminal to one of the output terminals, having a stepping terminal connected to said sequencing switch, for being responsive to said stepping signal to disconnect the input terminal from said one of the output terminals and to connect said input terminal to another of the output terminals, successive stepping signals connecting the input terminal in succession to each of the output terminals in a predetermined cyclical sequence, each of the radio transmitters connected to a different one of the output terminals;

a manual radio selector switch means having an input terminal connected to the microphone, having output terminals, manually controlled by the operator to selectively connect the input terminal to any one of the output terminals of the selector switch means, a particular one of the output terminals of the selector switch means being connected to the input terminal of said cyclical stepping switch, and each of the radio transmitters connected to a different one of the other output terminals of the selector switch means;

whereby when the input terminal of said manual radio selector switch means is connected to that particular one of the output terminals which is connected to the input terminal of said cyclical stepping switch, the operator can select a transmitter by actuating said sequencing switch, without having to remove his hand from the control stick.

2. The apparatus of claim 1 further comprising indicator lamps and a source of electrical power for operating the indicator lamps, and wherein said cyclical stepping switch further comprises a second gang including a second input terminal and second output terminals, the second input terminal connected to the source of electrical power and each of the indicator lamps connected to a different one of the second output terminals, each of said indicator lamps associated with one of the radio transmitters, whereby the position of said cyclical stepping switch is indicated by whichever of said indicator lamps is lit.

3. The apparatus of claim 2 further comprising in combination:

keying means for generating a keying signal indicating when the operator is transmitting on one of the radio transmitters; and, blinker means connected to said keying means and connected between the second output terminals of the second gang of said cyclic stepping switch and said indicator lamps for periodically interrupting the flow of electrical power to the indicator lamps when the keying signal is being generated.

* * * * *